United States Patent
Vobian et al.

(10) Patent No.: US 6,415,088 B1
(45) Date of Patent: Jul. 2, 2002

(54) METHOD OF COMPENSATING THE DISPERSION OF FLUORINE-BASED FIBER LASERS IN THE SECOND OPTICAL WINDOW

(75) Inventors: Joachim Vobian, Mühltal; Reiner Boness, Coswig; Heinz Döring, Mittweida; Jens Peupelmann, Freiberg; Uwe Schmietainski, Hemmingen, all of (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 09/269,681

(22) PCT Filed: Sep. 13, 1997

(86) PCT No.: PCT/EP97/05021
§ 371 (c)(1),
(2), (4) Date: Jul. 2, 1999

(87) PCT Pub. No.: WO98/15040
PCT Pub. Date: Apr. 9, 1998

(30) Foreign Application Priority Data

Sep. 30, 1996 (DE) .......................... 196 41 522

(51) Int. Cl.$^7$ ................................ G02B 6/16
(52) U.S. Cl. .................... 385/123; 385/27; 372/6
(58) Field of Search ................ 372/6; 385/15, 385/27, 39, 50, 123–127

(56) References Cited

U.S. PATENT DOCUMENTS

| | | | |
|---|---|---|---|
| 4,835,778 A | | 5/1989 | Kafka et al. .................. 372/6 |
| 5,309,452 A | | 5/1994 | Ohishi et al. .................. 372/6 |
| 5,361,319 A | * | 11/1994 | Antos et al. ................. 385/123 |
| 5,422,897 A | | 6/1995 | Wyatt et al. ................... |
| 5,568,583 A | * | 10/1996 | Akasaka et al. ............. 385/123 |
| 5,587,830 A | * | 12/1996 | Chraplyvy et al. ..... 385/123 X |
| 5,673,354 A | * | 9/1997 | Akasaka et al. ............. 385/127 |
| 5,719,696 A | * | 2/1998 | Chraplyvy et al. ..... 385/123 X |
| 6,011,892 A | * | 1/2000 | Chraplyvy et al. ......... 385/123 |

FOREIGN PATENT DOCUMENTS

| | | |
|---|---|---|
| DE | 32 21 836 | 1/1983 |
| EP | 0 320 665 | 6/1989 |
| EP | 0 637 109 | 2/1995 |
| EP | 0 665 615 | 8/1995 |
| EP | 0 683 550 | 11/1995 |
| EP | 0 721 119 | 7/1996 |
| GB | 2 239 983 | 7/1991 |

OTHER PUBLICATIONS

Guy et al., "Femtosecond soliton generation in a praseodymium fluoride fiber laser," Optics Letters, Jun. 1, 1994, USA, vol. 19, No. 11, pp. 828–830.

Kuizenga et al., "FM and AM Mode Locking of the Homogeneous Laser–Part I: Theory," IEEE J. Quant. Electr. 6 (1970), p. 694 with the supplement by G. Geister, "Integrierte optische Modulation von Nd–Faserlasern," [Integrated optical modulation of Nd fiber laser] etc. Mentioned in specification. (Nov. 1970).

Ohishi et al., "$Pr^{3+}$–doped fluoride single–mode fiber laser," IEEE Photonics Technol. Lett., 3 (Aug. 1991), 688 Mentioned in specification.

(List continued on next page.)

Primary Examiner—John D. Lee
(74) Attorney, Agent, or Firm—Kenyon & Kenyon

(57) ABSTRACT

A method of manipulating a compensation fiber for compensating the high negative dispersion of a fiber laser in the second optical window. The active fiber of the fiber laser is linked to a compensation fiber which consists of a step-index quartz glass core with a sheathing. By doping the compensation fiber sheathing with fluorine in a targeted manner, a positive value is set for the dispersion of the compensation fiber. Subsequent dimensioning of the length of the compensation fiber increases the set dispersion value to the positive dispersion value necessary for complete compensation of the dispersion of the fiber laser.

8 Claims, 2 Drawing Sheets

OTHER PUBLICATIONS

Döring et al., "$Pr^{3+}$–doped 1.3μm fiber laser using direct coated dichroitic mirrors," Electr. Lett. 31 (Jun. 1995) 13, 1068 Mentioned in specification.

Ortega et al., "Iterative Solution of Nonlinear Equations in Several Variables," (New York, Academic 1970) Textbook, specific pages enclosed, pp. 63, 503–504.

Snyder et al., "Optical Waveguide Theory," (London: Chapman and Hall) Textbook, specific page enclosed, pp. 219–220, 229–231 (No Date).

Vengsarkar et al., "Fundamental–mode dispersion–compensating fibers: design considerations and experiments," OFC 94, Technical Digest ThK2, San Jose, 1994, 225 Mentioned in specification.

Boness et al., "Tailoring of dispersion–compensation fibres with high compensation ratios up to 30," Pure Appl. Opt. 5 (1995),333 Mentioned in specification.

Pataca et al., "Actively modelocked $Pr^{3+}$–doped fluoride fibre laser," Electronics Letters, Jun. 9, 1994, vol. 30, No. 12, pp. 964–965.

Hodel, W., "Aufbau eines Festkörperlasers im 1300nm Wellenängenbereich" [Structure of a Solid Body Laser in the 1300 nm Wavelength Range]. Zwischenbericht zum Forschungsauftrag Nr. 283 der GD PTT Uni Bern, Nov. 30, 1993. Mentioned in Specification.

Geister, G. "Integrierte optische Modulation von Neodym–Faserlasern" [Integrated Optical Modulation of Nyodymium Fiber Lasers]. Fortschritts–Berichte VDI Reihe 10 (1990) 140, 1, 102. Mentioned in specification.

Cited in German counterpart Search Report—which is attached hereto. Heinz Döring et al., "1,3 μm Faserlaser mit direkt aufgebrachten Laserspiegeln auf der Basis von $Pr^{3+}$–dotiertem Fluoridglas", Laser Magazin, Mar. 1995, pp. 8, 10 & 12.

Cited in German counterpart Search Report—which is attached hereto. Makoto Shimizu et al., "28.3 dB Gain 1.3 μm–Band Pr–Doped Fluoride Fiber Amplifier Module Pumped by 1.017 μm InGaAs–LD's", IEEE Photonics Technology Letters, vol. 5, No. 6, Jun. 1993, pp. 654–657.

Cited in German counterpart Search Report—which is attached hereto. C.D. Pool et al., "Elliptical–Core Dual–Mode Fiber Dispersion Compensator", IEEE Photonics Technology Letters, vol. 5, No. 2, Feb. 1993, pp. 194–197.

Cited in German counterpart Search Report—which is attached hereto. "Chirped Picosecond Injection Laser Pulse Transmission in Single–Mode Fibres in the Minimum Chromatic Dispersion Region", Electronics Letters, vol. 19, No. 20, Sep. 29, 1983, pp. 837–838, Lin et al.

Cited in German counterpart Search Report—which is attached hereto. JP 5–226735, Patents Abstracts of Japan, E–1475, Dec. 13, 1993, vol. 17, No. 676.

* cited by examiner

METHOD OF COMPENSATING THE DISPERSION OF FLUORINE-BASED FIBER LASERS IN THE SECOND OPTICAL WINDOW

FIELD OF THE INVENTION

The present invention relates to compensation for dispersion of fluoride based fiber lasers, and more particularly to a method for compensation for dispersion of fluoride based fiber lasers in the second optical window.

RELATED TECHNOLOGY

In fiber lasers, fluoride glass materials (ZBLAN) are used in the second optical window in place of quartz-based glass. In general, $Pr^{3+}$ is used as the dopant. See:

[1] Ohishi, Y.; Kanamori, T.; Takahashi, S.: "$Pr^{3+}$-doped fluoride single-mode fiber laser." IEEE Photonics Technol. Lett., 3 (1991), 688;

[2] Hodel, W.: "Aufbau eines Festkörperlasers im 1300nm Wellenlängenbereich" [Structure of a Solid Body Laser in the 1300 nm Wavelength Range]. Zwischenbericht zum Forschungsauftrag Nr. 283 der GD PTT Uni Bern, Nov. 30, 1993; and

[3] Döring, H.; Peupelmann, J.; Wenzel, F.: "$Pr^{3+}$-doped 1.3 µm fiber laser using direct coated dichroitic mirrors." Electr. Lett. 31 (1955) 13, 1068.

These fibers have a zero dispersion wavelength in the third optical window; in the second optical window, the dispersion is strongly negative. If the fiber laser is used as a soliton source or as a radiation source for ultrahigh-bit-rate linear transmission systems, the time width of the pulses must be as small as possible (<5–10 ps). With increasing dispersion, the pulse broadens increasingly. It is desirable to compensate for the dispersion of the fluoride glass fiber. The simplest and most effective option is to link the active fiber to a dispersion compensating (DC) fiber; the dispersion values D(λ) in ps/km nm should be on the same order of magnitude, but naturally must have opposite signs. Both fibers are components of the fiber resonator. From this it follows that the DC fiber should be as short as possible to minimize resonator losses.

The time half-value width with respect to time ($t_p$) of fiber lasers can be calculated using the Kuizenga-Siegman theory and its expansion by Geister. See;

[4] Kuizenga, D. J., Siegman, A. E.: "FM and AM Mode-Locking of the Homogeneous Laser - Part I: Theory." IEEE J. Quant. Electr. 6 (1970), 694 ; and

[5] Geister, G. "Integrierte optische Modulation von Neodym-Faserlasern" [Integrated Optical Modulation of Nyodymium Fiber Lasers]. Fortschritts-Berichte VDI Reihe 10 (1990) 140, 1, 102.

$$\tau_p = \frac{\sqrt{2\sqrt{2}\ln 2}}{\pi}\left[\frac{1}{f_m^2 \delta_c}\right]^{1/4}\left[\left(\frac{\lambda^2 L_a}{2\pi c}D\right)^2 + \left(\frac{g}{\pi^2 \Delta f^2}\right)^2\right]^{1/8} \quad (1)$$

The half-value width $t_p$ is thus dependent on the modulation frequency $f_m$, the modulation index $\delta_c$, the laser wavelength λ, length $L_a$ of the active fiber, gain coefficient g, spectral half-value width Δλ of the fluorescence spectrum (corresponding to Δf) and the chromatic dispersion D of the fiber. The modulation frequency, modulation index, laser wavelength, gain coefficient, and fluorescence spectrum are either constants of the material or are specified parameters and thus cannot be manipulated. Fiber length $L_a$ is optimized for laser operation; thus it is also a constant. Accordingly, the only parameter which can be manipulated is chromatic dispersion D, which in the most favorable case is brought to zero to achieve minimal pulse widths. This means that the dispersion of the active fiber must be compensated for. This can be achieved though the use of chirped Bragg fiber grid as the laser mirror. In principle, input mirrors or output mirrors can be implemented as Bragg grids. If grids are used for both laser mirrors, they must have the same Bragg wavelength. Reflectivity, in particular that of the output mirror, must be maintained very precisely since otherwise the laser threshold will be elevated and the output power will be reduced. According to the Kuizenga-Siegman-Geister theory (see equation (1)) the half-value width with respect to time $\tau_p$ increases with decreasing fluorescence bandwidth Δf. If the spectral width of the chirped Bragg grid is smaller than the fluorescence bandwidth, the latter will limit the minimum pulse width. To reduce the pulse width to the theoretical limit, a spectral grid width of around 60 nm would be required. The technology of grid manufacture, however, currently is by far not sufficiently advanced for the manufacture of chirped Bragg fiber grids with defined reflexivity and adequately large spectral bandwidth.

SUMMARY OF THE INVENTION

In contrast to this, the present invention compensates for the dispersion through the addition of a dispersion compensating fiber in the resonator. In high-bit-rate systems, dispersion compensation through DC fibers is a conventional method in the third optical window. See [6] Vengsarkar, A. M.; Miller, A. E.; Gnauck, A. H.; Reed, W. A.; Walker, K.: OFC 94, Technical Digest ThK2, San Jose, 1994, 225.

For this, compensation fibers with high negative dispersion are needed in the third optical window in order to compensate for the high positive dispersion of the standard fibers. In [7] Boness, R.; Nowak, W.; Vobian, J.; Unger, S.; Kirchhof, J: "Tailoring of dispersion-compensation fibres with high compensation ratios up to 30. " Pure Appl. Opt. 5 (1995), 333, an iterative, inverse method for determining parameters and optimizing profiles is introduced which is provided for DC fibers with high negative dispersion in the third optical window.

To determine the corresponding parameters of these special fibers, an inverse problem must be solved. For some predefined dispersion values, this is possible only by using a multivariable optimization method. See [8] Ortega, J. M.; Rheinboldt, C.: "Iterative Solution of Nonlinear Equations in Several Variables" (New York, Academic 1970).

It is necessary to minimize the generalized standard deviation, which is expressed as follows:

$$F(x) = \sum_{i=1}^{n} b(D(\lambda_i x) - D_i)^2 + b_{n+i}(\lambda_c(x) - \lambda_{c0})^2 + \quad (2)$$
$$b_{n+2}(W_f(x, \lambda_0 - W_{f0})^2$$

with respect to the unknown vector x. x=vector of the relative index of refraction $2\Delta_i$ ($1 \leq I \leq m$) and of the fiber radius, thus dim(x)=m+1, generally with m≦4.

$$2\Delta_i := \frac{n_i^2 - n_c^2}{n_c^2}$$

with $n_c$=refraction index of the outer cladding, in general 1.4573. $D_i$: specified discrete dispersion values at $\lambda_i$ ($1 \leq I \leq n$), with $n \geq \dim(x)$. $\lambda_{c0}$=specified cutoff of $LP_{11}$ mode, $w_{[symbol]0}$ of the specified Petermann-II-radius, $b_i$=suitable positive weighting factors.

To minimize the functional equation (2), the Levenberg-Marquardt algorithm [8] (damped Gauss-Newton method) is used. This program is based on a very stable and exact method for computing dispersion on the basis of the scalar wave equation, in which numeric differentiations are avoided [7].

In the case of the fluoride glass based fiber laser in the second optical window, the high negative dispersion at $\lambda$=1300 nm must be compensated for with correspondingly high positive dispersion. Such fibers were not known in the past; the same also applies to fiber profiles which accomplish the desired result.

A method according to the present invention is based on manipulating a compensation fiber so that through it, the high negative dispersion of a fiber laser can be compensated for in the second optical window.

BRIEF DESCRIPTION OF THE DRAWINGS

The present invention is further elucidated below with reference to the drawings, in which.

Parameters for fibers with a positive chromatic dispersion at $\lambda$=1300 nm are given below and several basic properties are described.

For step index fibers, it is known that in the waveguide dispersion of the dispersion factor $$DF = V * \frac{d^2(Vb)}{dV^2}$$

the behavior of the waveguide dispersion is critical (see, for example, [9] Snyder, A. W.; Love, J. D.: "Optical Waveguide Theory" (London: Chapman and Hall).

At V≈3, the sign of DF changes and with increasing V becomes negative, but with small absolute values which, in addition, pass through a minimum. This typical curve behavior must be considered.

In a known manner, in a step index waveguide, the $LP_{11}$ wave propagates for $V_c$>2404, i.e., the waveguide is then no longer in monomode, i.e., care must be taken that the cutoff wavelength of the $LP_{11}$ mode $\lambda_{c11}$ does not become too large. It can of course be larger than the operating wavelength (1300 nm). Since the $LP_{11}$ mode is only poorly controlled, it can be strongly damped by bending the fiber. Through appropriate dimensioning of the fiber parameters, it is possible to prevent the $LP_{02}$ mode from being capable of propagation.

To solve the problem, i.e., to achieve higher positive dispersion values, according to the present invention the following refractive index profile may be employed (FIG. 1):

A step profile in which the core is surrounded by a lowered refractive index trough. Lowering can be achieved in known manner through fluoride doping. $2\Delta_2$ values to −1.5 (see Philips dispersion-flat fibers) are technologically implementable. The profile of FIG. 1 is defined by the step height $2\Delta_1$, which is applied to the refractive index level of the exterior cladding, depth of the trough ($-2\Delta_2$), step radius r, and core radius a; beyond a, the refractive index remains constant.

$2\Delta_i$ is defined by the following equation:

$$2\Delta_i = \left(\frac{n_i^2 - n_{SiO_2}^2}{n_{SiO_2}^2}\right) \cdot 100\,(\%)$$

Figure 1:
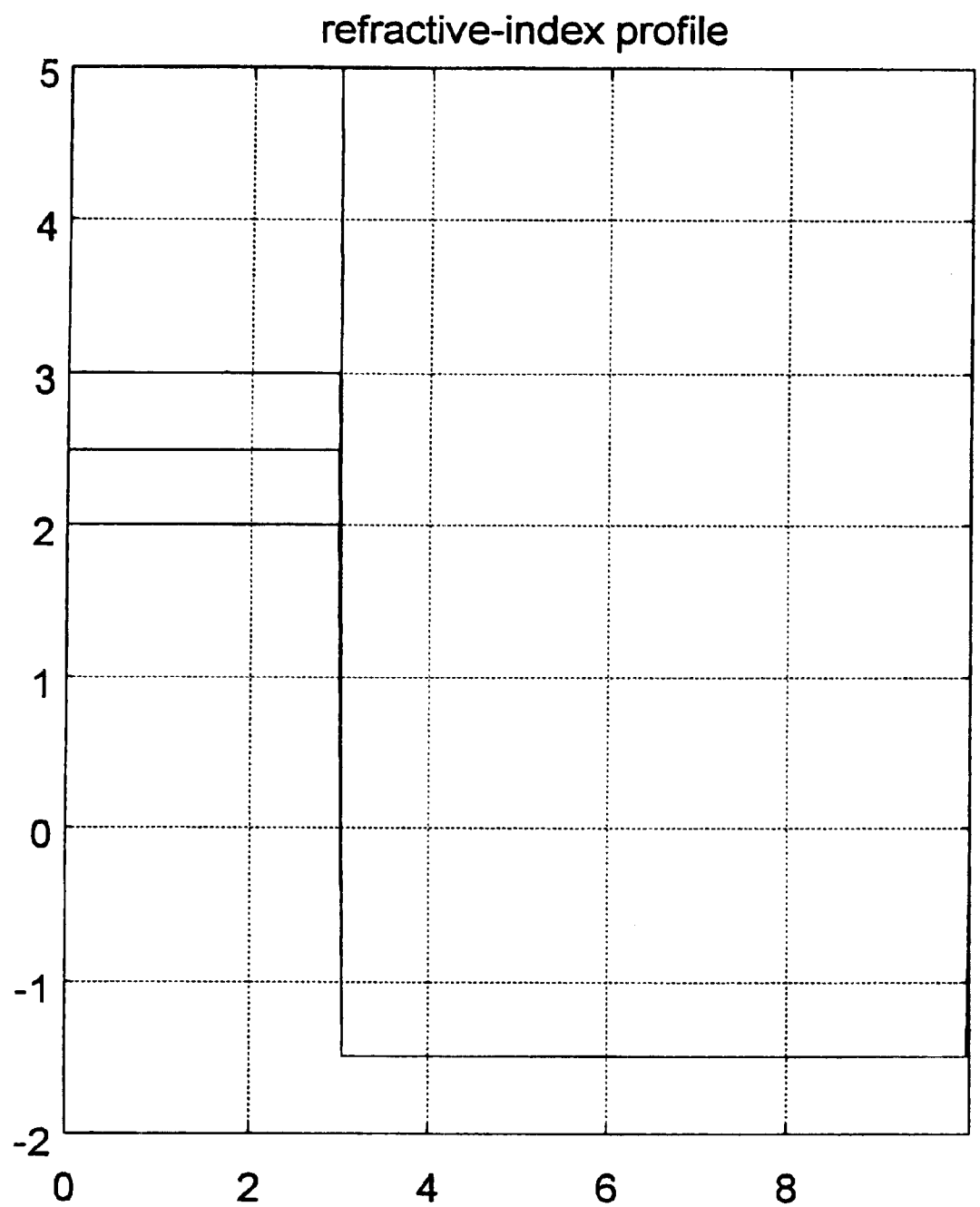
FIG. 1 shows refractive index profiles in accordance with the present invention.

In FIG. 1, the relative refractive index (as a percent) is represented by step index fibers with lowered trough $2\Delta_1$=5; 3; 2.5; and 2, $2\Delta_2$=−1.5; a=10 μm, r=3 μm.

Figure 2:
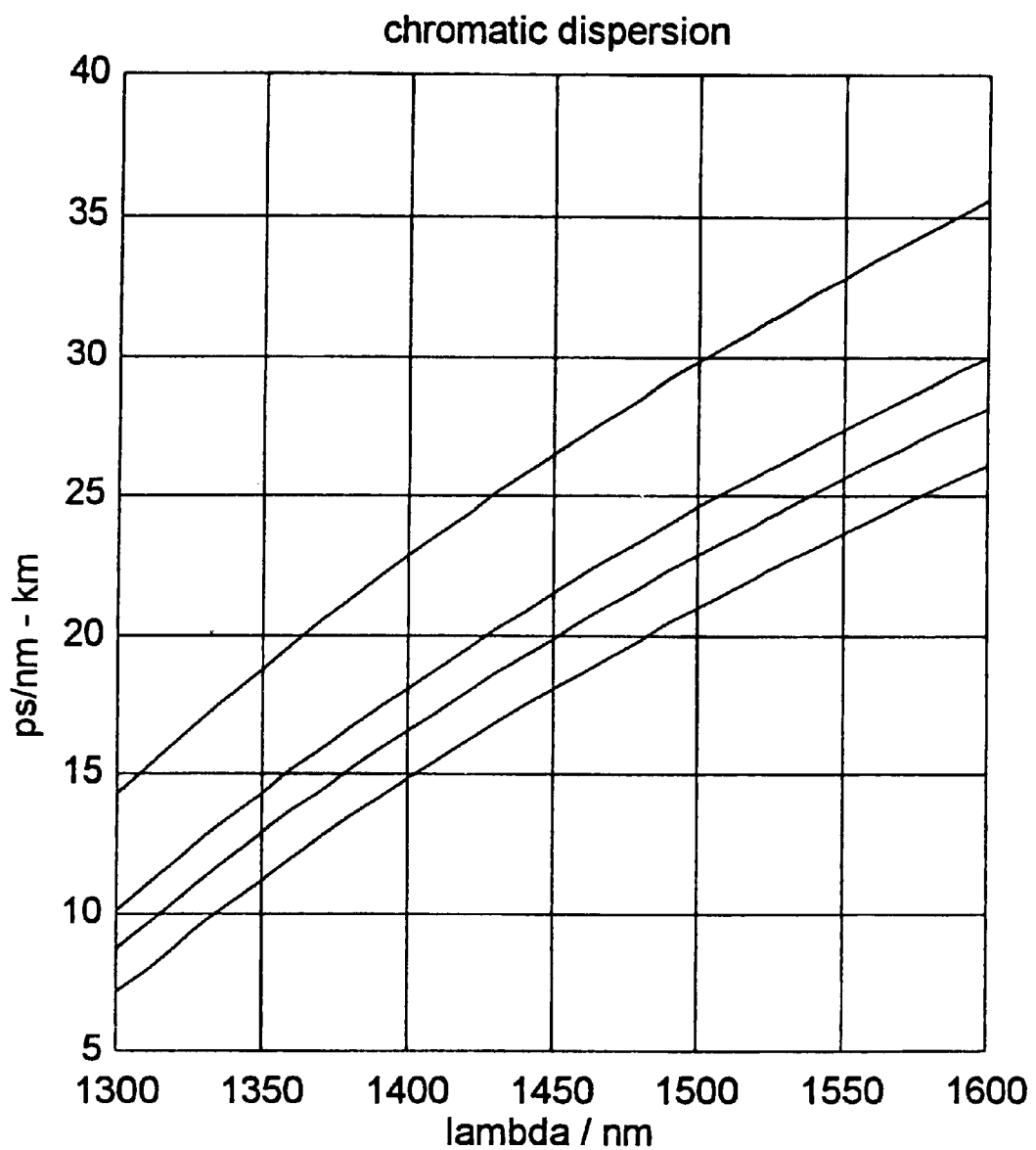
FIG. 2 shows dispersion curves of fibers having the profiles of FIG. 1.

FIG. 2 shows the dispersion curves of fibers with the profiles from FIG. 1.

In FIG. 2, the calculated dispersion curves which correspond to the profiles from FIG. 1 are plotted. The higher the selected $2\Delta_1$ values, the higher dispersion values are achieved. However, the cutoff wavelength of the $LP_{11}$ mode ($\lambda_{c11}$) also increases with $2\Delta_1$. This is of course undesirable, so a compromise must be found. The cutoff wavelength of the $LP_{11}$ mode, however, is lowered by the refractive index trough.

In Table 1, the calculated relevant fiber parameters are summarized: the Petermann I and II field radii ($w_{pI}$ and $w_{pII}$), the MAC index, the dispersion values, in each case for $\lambda$=1310 nm and cutoff wavelength $\lambda_{c11}$ (a=10 μm, r=3 μm).

$2\Delta_2$ was set at −1.5 and −1. It can be seen that with decreasing $2\Delta_1$ values, both D(1310 nm) and $\lambda_{c11}$ decrease, the first effect being of course undesired, the second being desired. As a compromise, the value pairs $2\Delta_1/2\Delta_2$=2.5/−1.5 or $2\Delta_1/2\Delta_2$=2.5 /−1 appear to be reasonable. It can also be seen that high negative $2\Delta_2$ values are favorable. The field radii do not change dramatically.

Table 1 shows the influence of step height $2\Delta_1$ and of trough depth $2\Delta_2$ on the dispersion value at 1300 nm on the cutoff wavelength, the MAC index, and the Petermann I and II field radii (=1210 nm, a=10 μm, r=3 μm):

| $2\Delta_1/2\Delta_2$ | $W_{PI}$(μm) | $W_{PI}$(μm) | MAC-No | D(ps/km*nm) | $\lambda_{c11}$(nm) |
|---|---|---|---|---|---|
| 5/−1.5 | 2.4 | 2.3 | 1.86 | 15.27 | 2193 |
| 3/1.5 | 2.5 | 2.45 | 1.94 | 11.00 | 1635 |
| 2.5/−1.5 | 2.55 | 2.5 | 1.98 | 9.57 | 1471 |
| 2/−1.5 | 2.6 | 2.55 | 2.02 | 7.95 | 1292 |
| Z-Fiber |  | 4.9 |  | 0.81 | 1195 |
| 5/−1 | 2.4 | 2.3 | 1.82 | 14.34 | 2254 |
| 3/−1 | 2.55 | 2.5 | 1.52 | 9.56 | 1686 |
| 2.5/−1.5 | 2.6 | 2.55 | 1.72 | 7.94 | 1518 |
| 2/−1 | 2.7 | 2.6 | 2.01 | 6.07 | 1335 |

In Table 1, the corresponding data of a Z fiber by Sumitomo is included for comparison, a step index fiber with silica glass core and fluoride doped cladding. While this fiber at $\lambda$=11300 nm also has a positive dispersion (0.8 ps/km nm), it is, however, smaller by around a factor of 10. Therefore around ten times the compensation fiber length would be required in the resonator. Nevertheless, the Z fiber at 1300 nm is a monomode fiber in the strict sense.

Table 2 shows the variation of r with constant a and variation of a at constant r ($\lambda$=1310 nm; a=10 μm; r=3 μm):

| a/r | $W_{PI}$(μm) | $W_{PI}$(μm) | MAC-No | D(ps/km*nm) | $\lambda_{c11}$(nm) |
|---|---|---|---|---|---|
| 10/4.5 | 3.5 | 3.4 | 1.55 | 8.69 | 2283 |
| 10/4.0 | 3.2 | 3.1 | 1.59 | 9.04 | 2026 |
| 10/3.5 | 2.9 | 2.8 | 1.64 | 9.00 | 1771 |
| 8/3.5 | 2.5 | 2.4 | 1.76 | 6.96 | 1417 |
| 9/3.5 | 2.7 | 2.6 | 1.69 | 8.42 | 1594 |

-continued

| a/r | $W_{P1}$(μm) | $W_{P1}$(μm) | MAC-No. | D(ps/km*nm) | $\lambda_{c11}$(nm) |
|---|---|---|---|---|---|
| 10/3.5 | 2.9 | 2.8 | 1.64 | 9.00 | 1771 |
| 11/3.5 | 3.1 | 3.0 | 1.60 | 9.09 | 1948 |

In Table 2, the influence of a and r is examined. At constant a (10 μm), the trend of D values is not uniform; generally D cannot be significantly influenced through variation of r in reasonable limits, but in contrast, the cutoff wavelength decreases with decreasing r. With constant r, a was varied. If a is not too small (for example, =8 μm), the a value, varied in reasonable limits, also does not have a great influence on D. In contrast, the cutoff wavelength drops with decreasing a.

Calculations have shown that the variation of the profile configuration does not provide significantly more favorable results. Triple and quadruple profiles and parabolic profiles were investigated. The simple step profile with sunken trough is adequate and is the simplest to verify technologically. In the tables, only output parameters that are technologically and physically reasonable were selected for the calculations.

What is claimed is:

1. A method for compensation of dispersion of a fluoride based fiber laser, a high negative dispersion of the fiber laser in a second optical window being compensated for with a compensation fiber, the method comprising:

coupling the active fiber of the fiber laser to the compensation fiber, the compensation fiber including a stepped silica glass core with cladding;

fluoride doping the cladding so as to achieve a controlled lowering of a refractive index of a grid trough, a degree of the lowering of the refractive index of the grid trough being determined according to the following relationship:

$$2\Delta_i = \left(\frac{n_i^2 - n_{SiO_2}^2}{n_{SiO_2}^2}\right) \cdot 100\,(\%);$$

and dimensioning a length of the compensation fiber so that a positive dispersion value achieved through the fluoride doping is elevated to a certain positive dispersion value required for compensation at λ=1300 nm, the positive dispersion value achieved through the fluoride doping increasing proportionally to the length.

2. The method according to claim 1 wherein the coupling of the active fiber to the compensation fiber is accomplished using splices.

3. The method according to claim 1 wherein the coupling of the active fiber to the compensation fiber is accomplished using plug-in connections.

4. The method according to claim 1 wherein the active fiber and the compensation fiber coupled to the active fiber are disposed in a resonator of the laser.

5. The method according to claim 1 wherein a defined pulse width is set by changing the length of the compensation fiber, a lower limit of the pulse width being determined by complete compensation, an upper limit of the pulse width being determined by the dispersion of the active fiber.

6. The method according to claim 1 wherein the stepped silica glass core includes pure silica glass.

7. The method according to claim 1 wherein the stepped silica glass core includes silica glass doped with germanium.

8. The method according to claim 1 wherein a lowering of a trough level $2\Delta_2$ is selected so as to be smaller than minus 2% and a step height $2\Delta_1$ is selected so as to be ≦5%.

* * * * *